United States Patent [19]

Calzolari et al.

[11] Patent Number: 4,902,096
[45] Date of Patent: Feb. 20, 1990

[54] OPTICAL FIBER CABLE WITH FIBER ENCLOSING TUBES IN TRANSPARENT CORE

[75] Inventors: Pietro Calzolari, Milan; Antonio Portinari, Sesto San Giovanni, both of Italy

[73] Assignee: Societa' Cavi Pirelli S.p.A., Milan, Italy

[21] Appl. No.: 209,230

[22] Filed: Jun. 20, 1988

[30] Foreign Application Priority Data

Jun. 30, 1987 [JP] Japan ............................. 21105 A/87

[51] Int. Cl.$^4$ ................................................ G12B 6/44
[52] U.S. Cl. ................................................ 350/96.23
[58] Field of Search ...................................... 350/96.23

[56] References Cited

U.S. PATENT DOCUMENTS

| | | | |
|---|---|---|---|
| 4,688,889 | 8/1987 | Pasini et al. | 350/96.23 |
| 4,715,678 | 12/1987 | Johnson et al. | 350/96.23 |
| 4,725,122 | 2/1988 | Anelli et al. | 350/96.23 |
| 4,741,592 | 5/1988 | Secco et al. | 350/96.23 |
| 4,804,245 | 2/1989 | Katayose et al. | 350/96.23 |

*Primary Examiner*—Frank Gonzalez
*Attorney, Agent, or Firm*—Brooks Haidt Haffner & Delahunty

[57] ABSTRACT

An optical fiber cable with an elongated core of transparent plastic material having a plurality of readily visible tubes of a dull material embedded therein and extending longitudinally thereof. Each tube loosely receives at least one optical fiber. The core has a plurality of grooves at the outer surface thereof which extend parallel to the paths of the tubes and which are spaced from the tubes, and the grooves have a hydrogen retaining material therein. Each groove is on a radial line intermediate pairs of tubes.

10 Claims, 1 Drawing Sheet

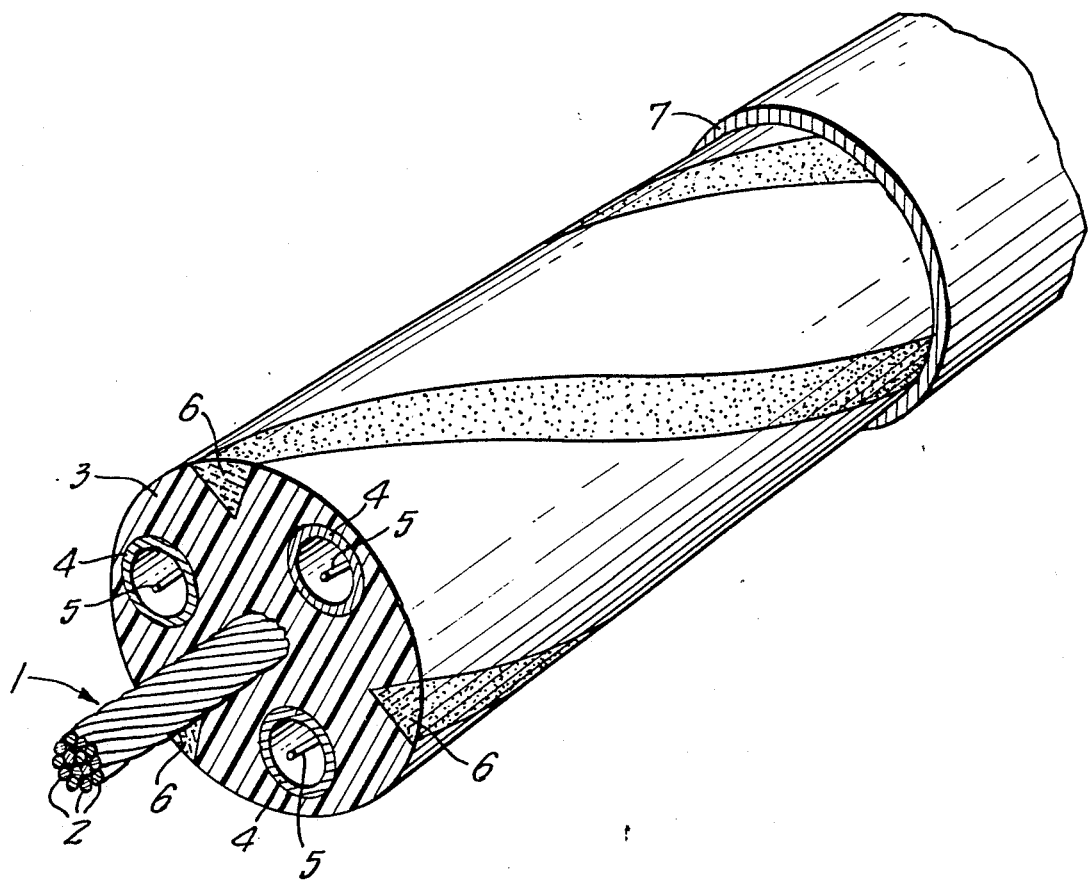

OPTICAL FIBER CABLE WITH FIBER ENCLOSING TUBES IN TRANSPARENT CORE

The present invention relates to an optical fiber cable of the type comprising, inside a sheath, a core of plastic material embedding small tubes which extend longitudinally of the cable and contain optical fibers in loose condition.

Cables of such type are already known and are, for example, described in U.S. Pat. Nos. 3,865,466 and 4,191,448. Such known cables have the following disadvantages.

A first disadvantage is the impossibility of diverting optical fibers from the cable without completely interrupting its continuity. In fact, once the cable sheath is removed from the cable region where an optical fiber shunt is to be provided, it is not possible to locate the tubes containing the optical fibers. The only way of locating the tubes is to cut the cable completely along a plane perpendicular to the longitudinal axis of the cable.

It follows that, in such known cables, whenever it is desired to make a connection to one of the optical fibers contained in one of the tubes, it is necessary to cause a discontinuity in all the cable components, and consequently, also in the tubes and in the optical fibers not involved in the connection and then, to restore said continuity between the cable elements and, in particular, between the other tubes and the optical fibers not involved in the connection to one of the fibers.

This operation, besides being extremely complicated, involves the risk of causing damage to the cable, such as, for example, the risk of causing attentuation of the signals transmitted by the optical fibers not involved in the connection, due to incorrectnesses in the performance of the connections effected to restore the cable continuity.

A further drawback of the known cables of this type is a limitation in the selection of the substances, able to absorb permanently any trace of hydrogen and which may have been introduced in the cable to protect the optical fibers against the harmful action which hydrogen might have on them.

Within the sheath of such cables, the space available for the admission of substances able to absorb hydrogen is only the small tubes containing the optical fibers.

Therefore, the optical fibers are necessarily in direct contact with the substances which must permanently retain hydrogen to prevent the latter from damaging said optical fibers.

The direct contact between the optical fibers and the substances able to absorb hydrogen leads to the exclusion of those substances, the presence of which might damage the optical fibers.

For example, it is impossible to use in the conventional cables of this type those substances which are able to absorb hydrogen and which contain granules of material having a size over 10 microns, since these granules, hindering the free motion of the optical fibers inside the small tubes, would cause microbendings in the fibers with consequent impairment thereof.

The main object of the present invention is to provide an optical fiber cable which does not have the above-described disadvantages and which allows simple and reliable performance of connections to the optical fibers of the cable without the risk of causing damage to the latter as well as the introduction, without any limitation as to its selection, of any substance able to retain traces of hydrogen or relevant amounts of the same in order to protect the optical fibers against the prejudicial action which hydrogen might have on them.

The preferred embodiment of the present invention is an optical fiber cable which comprises a sheath enclosing a core of plastic material embedding at least one small tube which extends longitudinally of the core and which loosely contains at least one optical fiber, the cable being characterized in that the core is made of transparent material wherein the small tubes are made of a material which is readily visible through the material of the core, such as a low reflecting or colored material, and in that the radially outermost surface of the core is provided with recesses extending along the core in a direction parallel to the paths of the small tubes, at least one recess being provided in each region of said core which is between adjacent small tubes.

The objects, features and advantages of the present invention will be more readily apparent from the following detailed description of a preferred embodiment thereof, which description should be considered in conjunction with the accompanying drawing, the single FIGURE of which illustrates, in perspective view and with parts broken away, a portion of a cable of the invention.

With reference to the drawing, the cable therein illustrated comprises, from the inside to the outside, a strand 1, formed by stranding together a plurality of wires 2 made of a material having high mechanical characteristics, such as, for example, steel, an aromatic polyamide, nylon and the like, which occupies the radially innermost portion of the cable.

In particular, said strand 1 has dimensions which enable it to withstand the mechanical stresses to which the cable is subjected during its manufacture and laying.

A core 3 of transparent plastic material is applied around strand 1 and the tubes 4, preferably, by means of an extrusion process.

A significant feature of said core 3, for the purposes of the present invention, is that it can be made of any transparent plastic material. In this specification, the term "transparent", as it refers to the material forming the core 3 of a cable, means any material through which the elements embedded in the core 3 can be clearly seen or simply located. Examples of transparent plastic materials which can be used to form the cable core 3 are polyethylene, polypropylene and nylon.

The cable core 3 embeds the small tubes 4 which loosely contain at least one optical fiber 5. The small tubes 4 shown in the drawing have, in section, a circular shape, but other cross-sectional shapes can be used. The tubes 4 extend longitudinally of the core along a helical path which can be of a closed or of an open type, the latter term meaning that the helix is formed by alternating S-shaped or Z-shaped portions.

An essential feature of the present invention is that the small tubes 4 are made of a material which is readily visible through the material of the core 3. Generally speaking, they will be made of a dull material which, as used herein, means a material having color or reflectivity characteristics which makes the tubes 4 visible through the transparent material of the core 3. Examples of dull material from which the small tubes 4 can be made are metallic materials and plastic materials of any type which are colored with inorganic pigments.

Preferably, the small tubes 4 of the cable are differently colored to permit distinguishing one tube 4 from another tube 4.

The core 3, at its radially outermost surface, is provided with grooves 6 which extend longitudinally of the core 3 and follow a path identical in shape to that of the small tubes 4 embedded in the core 3. Said grooves 6 which, in a section perpendicular to the cable axis, preferably are wedge-shaped, are provided in a number at least equal to the number of small tubes 4 embedded in the core 3 and at least one groove is present in each portion of said cable core 3 between adjacent small tubes 4.

The grooves 6 are filled with any substance capable of retaining, in a permanent way and either physically or chemically, both traces and relatively large amounts of hydrogen so as to ensure that the hydrogen cannot reach the optical fibers 5 loosely contained in the small tubes 4 and thereby damage them.

Substances able to carry out such function are, for example, the powders of metallic elements able to physically absorb hydrogen are known and can be those substances described in U.S. Pat. No. 4,718,747.

Alternatively, and still by way of example, substances able to carry out such function are the compositions suitable to react chemically with hydrogen, such as those described in U.S. Pat. Nos. 4,688,889; 4,725,122; 4,725,123 and 4,741,592.

A sheath 7, made for instance of metallic or plastic material and closing recesses 6, is provided around the cable core 3.

The cable described herein and illustrated in the drawing represents only one specific embodiment of a cable according to the invention, but the cable of the invention can have other structure provided that it has the following characteristics:

(1) The cable core is made of transparent plastic material and has embedded therein small tubes of dull material loosely containing the optical fibers; and (2) The radially outermost surface of the cable core is provided with grooves extending longitudinally of said core (preferably along paths identical to the paths of the small tubes) which contain a substance able to retain permanently both very small traces and relatively large amounts of hydrogen. In any cable according to the invention, at least one groove is present in each portion of the cable core disposed between pairs of adjacent small tubes.

A cable of the present invention may also differ from the cable illustrated in the drawing only in the omission of the strand 1.

From the foregoing description and from the considerations set forth hereinafter, it will be apparent that the cables according to the invention achieve the objects of the invention.

In fact, the presence in a cable of a core of transparent plastic material in which small tubes of dull material are embedded, and particularly if the tubes have different colors, provides the possibility, when the sheath 7 is removed from the cable, to locate immediately the position of the small tubes, thereby avoiding the need, as with the prior art cables, of performing a complete cutting of the cable to locate the small tubes it contains.

Said immediate location of the small tubes inside the cable core leads to the possibility, when a connection concerning the optical fiber or fibers contained in one small tube is to be effected, of separating only the portion of cable core containing said one small tube and of effecting only on it the operations required for the connection without being compelled to act on all the other cable components and, consequently, on the other small tubes and optical fibers contained therein.

Consequently, there is no risk of causing damage to the cable components, particularly the other fibers during the performance of a connection.

Further, the fact that the outer surface of the cable core is provided with grooves which have paths identical in shape to the paths of the small tubes and which, in pairs, are arranged side-by-side with respect to the individual small tubes, facilitates the separation from the cable of core portions containing only one small tube.

In fact, said grooves constitute a guide for any blade used to effect cuts in the core parallel to one small tube to be able to separate it from the others contained in the cable.

Moreover, the grooves, flanking in pairs the individual small tubes containing the optical fibers, provide the possibility of introducing into them any known substance able to retain hydrogen and of ensuring an efficient protection of the optical fibers.

In this way, it is not necessary, as in known cables, to limit the selection of the substance able to retain hydrogen permanently since, in the cable according to the invention, these substances are not in direct contact with the optical fibers and, therefore, cannot exert onto them any negative effect.

Although preferred embodiments of the present invention have been described and illustrated, it will be apparent to those skilled in the art that various modifications may be made without departing from the principles of the invention.

We claim:

1. An optical fiber cable comprising:
   an elongated core of transparent plastic material;
   at least one tube of a dull material embedded in said core and disposed along a path extending longitudinally of said core, said tube being disposed radially inwardly of the periphery of said core but being visible from externally of said core by reason of the transparency of said transparent plastic material of said core;
   at least one optical fiber loosely received in said tube; and
   said core having at least one cutting blade guiding groove therein adjacent but spaced from said tube and at the peripheral surface of the core, said groove following a path parallel to the path of said tube and being free of a material which can prevent insertion of a blade in said groove and cutting of the core parallel to said tube for separating said tube from said core independently of cutting of the remainder of the core
   whereby said groove provides a guide for a cutting blade for separating a tube from said core without completely cutting said core into two parts in a plane extending transversely to the length of said core.

2. An optical fiber cable as set forth in claim 1 wherein said groove is shaped in a cross-section transverse to the longitudinal axis of said core, said groove having its greatest width radially outwardly of said axis.

3. An optical fiber cable as set forth in claim 1 wherein there are a plurality of tubes of a dull material embedded in said core in circumferentially spaced relation to each other, each of said tubes extending along paths extending longitudinally of said core and loosely receiving at least one optical fiber, and wherein there are a plurality of grooves in said core adjacent but spaced from said tubes, each of said grooves following a path parallel to the path of at least one said tube.

4. An optical fiber cable as set forth in claim 3 wherein each groove is disposed along a line radially of the axis of said core and intermediate a pair of said tubes.

5. An optical fiber cable as set forth in claim 3 further comprising a sheath encircling said core.

6. An optical fiber cable comprising:
an elongated core of transparent plastic material;
at least one tube of a dull material embedded in said core and disposed along a path extending longitudinally of said core;
at least one optical fiber loosely received in said tube;
said core having at least one groove therein adjacent but spaced from said tube, said groove following a path parallel to the path of said tube; and
a hydrogen retaining material disposed in said groove.

7. An optical fiber cable as set forth in claim 6 wherein said groove is at the outer surface of said core.

8. An optical fiber cable comprising:
an elongated core of transparent plastic material;
a plurality of tubes of a dull material embedded in said core, each disposed along a path extending longitudinally of said core and in circumferentially spaced relation to each other;
at least one optical fiber loosely received in each of said tubes;
said core having a plurality of grooves therein adjacent but spaced from said tubes, each of said grooves following a path parallel to the path of at least one said tubes; and being disposed along a line radially of the axis of said core and intermediate a pair of said tubes; and
a hydrogen retaining material disposed in each of said grooves.

9. An optical fiber cable comprising:
an elongated core of transparent plastic material;
a plurality of tubes of a dull material embedded in said core, each disposed along a path extending longitudinally of said core and in circumferentially spaced relation to each other, each tube having a color different from the color of the others of said tubes;
at least one optical fiber loosely received in each of said tubes; and
said core having a plurality of grooves therein adjacent but spaced from said tubes, each of said grooves following a path parallel to the path of at least one of said tubes.

10. An optical fiber cable comprising:
an elongated core of transparent plastic material;
a plurality of tubes of a dull material embedded in said core, each disposed along a path extending longitudinally of said core and in circumferentially spaced relation to each other, said tubes being made of a colored plastic material;
at least one optical fiber loosely received in each of said tubes; and
said core having a plurality of grooves therein adjacent but spaced from said tubes, each of said grooves following a path parallel to the path of at least one of said tubes.

* * * * *

UNITED STATES PATENT AND TRADEMARK OFFICE
CERTIFICATE OF CORRECTION

PATENT NO. : 4,902,096
DATED : February 20, 1990
INVENTOR(S) : Calzolari et al

It is certified that error appears in the above-identified patent and that said Letters Patent is hereby corrected as shown below:

Col. 4, line 59, before "shaped" --V-- should be inserted.

Signed and Sealed this

Fifth Day of June, 1990

Attest:

HARRY F. MANBECK, JR.

*Attesting Officer*     *Commissioner of Patents and Trademarks*